(12) United States Patent
Yamazaki et al.

(10) Patent No.: US 11,405,600 B2
(45) Date of Patent: Aug. 2, 2022

(54) STEREO CAMERA

(71) Applicant: HITACHI, LTD., Tokyo (JP)

(72) Inventors: Kazuyoshi Yamazaki, Tokyo (JP); Toshiki Ishii, Tokyo (JP)

(73) Assignee: HITACHI, LTD., Tokyo (JP)

( * ) Notice: Subject to any disclaimer, the term of this patent is extended or adjusted under 35 U.S.C. 154(b) by 157 days.

(21) Appl. No.: 16/910,992

(22) Filed: Jun. 24, 2020

(65) Prior Publication Data

US 2021/0006771 A1 Jan. 7, 2021

(30) Foreign Application Priority Data

Jul. 5, 2019 (JP) .............................. JP2019-125786

(51) Int. Cl.

| | | |
|---|---|---|
| *G03B 17/17* | (2021.01) | |
| *G03B 35/08* | (2021.01) | |
| *G03B 37/06* | (2021.01) | |
| *H04N 13/218* | (2018.01) | |
| *H04N 13/296* | (2018.01) | |
| *H04N 13/207* | (2018.01) | |
| *G02B 17/06* | (2006.01) | |
| *B60Q 1/00* | (2006.01) | |
| *H04N 5/225* | (2006.01) | |

(52) U.S. Cl.
CPC ......... *H04N 13/207* (2018.05); *B60Q 1/0023* (2013.01); *G02B 17/0605* (2013.01); *H04N 5/2253* (2013.01); *H04N 5/2254* (2013.01)

(58) Field of Classification Search
CPC .. B60Q 1/0023; G02B 17/0605; G02B 17/17; G03B 35/08; G03B 37/06; H04N 13/207; H04N 13/218; H04N 13/296; H04N 2213/001; H04N 5/2253; H04N 5/2254
USPC .......................................................... 348/46
See application file for complete search history.

(56) References Cited

U.S. PATENT DOCUMENTS

| | | | | |
|---|---|---|---|---|
| 2006/0268103 A1* | 11/2006 | Kweon | ................ | H04N 13/218 348/36 |
| 2016/0137126 A1* | 5/2016 | Fursich | ................ | H04N 13/239 348/38 |

FOREIGN PATENT DOCUMENTS

JP 4388530 B2 12/2009

* cited by examiner

*Primary Examiner* — Patricia I Young
(74) *Attorney, Agent, or Firm* — Volpe Koenig (57) ABSTRACT

A first mirror has a first reflecting surface convexed in a first direction, a first apex, and a first fan shape. A second mirror has a second reflecting surface convexed in a second direction, a second apex, and a second fan shape. An imaging optical system forms images from a first light emitted from an object, reflected by the first reflecting surface, and subsequently further reflected by the second reflecting surface, and a second light emitted from the object and reflected by the second reflecting surface. The first and second fan shapes have interior angles of 180° or more. A center position of the image sensor is displaced with respect to an optical axis of the imaging optical system. A short side of a photo-receiving surface of the image sensor and a center line of the image of the first or second fan shape are approximately parallel.

9 Claims, 6 Drawing Sheets

IMAGING LENS IMAGE HEIGHT CHARACTERISTICS

STEREO CAMERA

CROSS REFERENCE TO RELATED APPLICATIONS

The present application claims priority from Japanese patent application JP 2019-125786, filed on Jul. 5, 2019, the entire content of which is hereby incorporated by reference into this application.

BACKGROUND

Technical Field

The present invention relates to a stereo camera.

Background Art

There has been known a stereo camera that simultaneously captures images of an object from a plurality of different directions, and this ensures obtaining information, such as a distance to the object. A development of the stereo camera has been advanced as a camera for, for example, automatic driving, automatic braking, and automatic tracking in an automobile.

In order to achieve fully automatic driving in an automobile, it is necessary to accurately detect and range an object moving at a high speed in a wide range around a host vehicle. For example, when an object (such as a motorcycle) that moves at 70 km/h is detected with a sensor at a front end of an automobile, imaging with an angular resolution of 0.06°/pixel and a ranging accuracy of 10% with a distance of 100 m are assumed to be necessary.

With respect to such a request, an existing Laser Imaging Detection and Ranging (LiDAR) and a millimeter-wave radar have a problem that they need to use a camera in combination in order to accurately detect their surroundings. In the case of a scan type detecting device, there is a problem of being expensive due to a necessity of a movable part and an insufficient response speed.

With a conventional stereo camera, two image sensors are usually necessary to be separated by an interval corresponding to a parallax for mounting, thereby causing an increased cost and an increased size of an autonomous vehicle. There are problems that the increased size makes it difficult to arrange them at the right and left front ends of an automobile and ensure their wide-angle sensing (see Japanese Patent No. 4388530).

Thus, when a stereo camera is mounted on an autonomous vehicle, a stereo camera that ensures sensing with a high accuracy and at a wide-angle, and is small in size is desired.

SUMMARY

The present invention provides a stereo camera that ensures sensing with a high accuracy and at a wide-angle, and is small in size.

In order to solve the above-described problem, a stereo camera according to the present invention includes a first mirror, a second mirror, an imaging optical system, and an image sensor. The first mirror has a first reflecting surface as a curved surface convexed in a first direction, a first apex, and a first fan shape. The second mirror has a second reflecting surface convexed in a second direction opposite to the first direction, a second apex opposing to the first apex, and a second fan shape. The imaging optical system forms images from a first light and a second light. The first light is emitted from an object, reflected by the first reflecting surface, and subsequently further reflected by the second reflecting surface. The second light is emitted from the object and reflected by the second reflecting surface. The image sensor receives the first light and the second light through the imaging optical system. The second mirror includes an inside mirror and an outside mirror. The outside mirror is positioned in an outer circumferential side with respect to the inside mirror. The outside mirror has a conic constant different from a conic constant of the inside mirror. The first fan shape and the second fan shape have interior angles of 180° or more. Furthermore, the image sensor is arranged such that a center position of the image sensor is arranged at a position displaced with respect to an optical axis of the imaging optical system, and a short side of a photo-receiving surface of the image sensor and a center line of the image of the first fan shape or the second fan shape are approximately parallel.

The present invention ensures providing a stereo camera and a stereo camera integrated headlight unit that ensure sensing with a high accuracy and at a wide-angle, and is small in size.

DETAILED DESCRIPTION

The following describes embodiments with reference to the accompanying drawings. The accompanying drawings represent functionally identical elements by identical reference numerals in some cases. Although the accompanying drawings illustrate the embodiments and examples of implementation according to a principle of the present disclosure, these drawings are for understanding of the present disclosure and never used for limited interpretation of the present disclosure. The descriptions of this description are merely typical examples and therefore do not limit the claims or application examples of the present disclosure by any means.

While the embodiments give the description in detail enough for a person skilled in the art to carry out this disclosure, it is necessary to understand that other implementations and configurations are possible and that changes in configurations and structures and substitutions of various components can be made without departing from the scope and spirit of the technical idea of this disclosure. Therefore, the following description should not be interpreted to be limited.

First Embodiment

Figure 1:
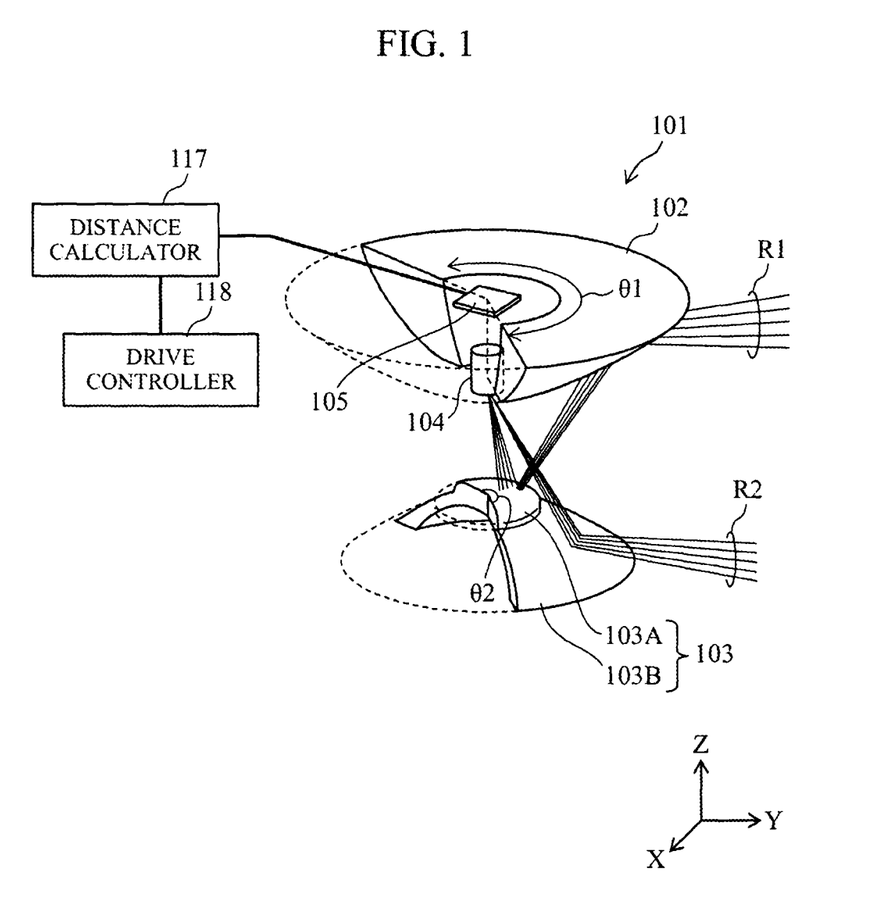
FIG. 1 is a schematic perspective view that describes a structure of a stereo camera 101 according to a first embodiment.

With reference to FIG. 1, a stereo camera 101 according to the first embodiment will be described. This stereo camera 101 is configured of an upper side hyperboloidal mirror 102, a lower side hyperboloidal mirror 103, an imaging optical system 104, and an image sensor 105 as one example. The stereo camera 101 is coupled to a distance calculator 117 for generating distance information and a drive controller 118 that drives and controls the system. One each of the imaging optical system 104 and the image sensor 105 is enough for a pair of the hyperboloidal mirrors (the upper side hyperboloidal mirror 102 and the lower side hyperboloidal mirror 103). The single image sensor 105 can obtain position information in a three-dimensional space of an object, thereby ensuring achieving a cost reduction compared with a conventional stereo camera that requires two image sensors.

The upper side hyperboloidal mirror 102 and the lower side hyperboloidal mirror 103 configure the hyperboloidal mirrors as a unit. The upper side hyperboloidal mirror 102 has a shape that follows an upper side hyperboloid convexed in the downward direction (the negative direction of a Z-axis (first direction)), and on the other hand, the lower side hyperboloidal mirror has a shape that follows a lower side hyperboloid convexed in the upper direction (the positive direction of the Z-axis (second direction) conversely. In other words, an apex of the upper side hyperboloidal mirror 102 and an apex of the lower side hyperboloidal mirror 103 are opposed, and the upper side hyperboloidal mirror 102 and the lower side hyperboloidal mirror 103 are arranged such that center axes Ox coincide. While in the example in FIG. 1, the upper side hyperboloidal mirror 102 is arranged in the upper side and the lower side hyperboloidal mirror 103 is arranged in the lower side, it is possible to invert this upper and lower positional relationship.

The lower side hyperboloidal mirror 103 is further divided into an inside hyperboloidal mirror 103A and an outside hyperboloidal mirror 103B. The inside hyperboloidal mirror 103A is arranged in a position including the apex of the hyperboloid, and the outside hyperboloidal mirror 103B is arranged in the outer circumferential side with respect to the outer edge of this inside hyperboloidal mirror 103A. The inside hyperboloidal mirror 103A and the outside hyperboloidal mirror 103B have their common center axes Ox. The inside hyperboloidal mirror 103A and the outside hyperboloidal mirror 103B have mutually different conic constants. The inside hyperboloidal mirror 103A and the outside hyperboloidal mirror 103B have a level difference at their boundary, and the inside hyperboloidal mirror 103A projects in the upper side compared with the outside hyperboloidal mirror 103B.

The upper side hyperboloidal mirror 102 does not have a reflecting surface over the whole circumference (360°) of the hyperboloid, but is notched into a fan shape (first fan shape) that has an interior angle θ1 of 180° or more and less than 360°. Similarly, the lower side hyperboloidal mirror 103 also does not have a reflecting surface over the whole circumference (360°) of the hyperboloid, but is notched into a fan shape (second fan shape) that has an interior angle θ2 of 180° or more and less than 360°. The interior angles θ1 and θ2 are set to angles corresponding to a horizontal view angle of the stereo camera 101.

Having such fan shapes ensures improving a resolution of the image sensor 105, and as the result, an accuracy of a distance measurement of the stereo camera can be improved. This will be described later. Note that the fan shape here is not limited to the shape that linearly notches a part of a circle along its radius. For example, as illustrated in FIG. 1, the shape that notches a reflecting surface near the apex is also included in the fan shape explained here. While the following describes that the interior angles θ1 and θ2 have the same values, they may have different values.

The stereo camera 101 causes the hyperboloidal mirrors (the upper side hyperboloidal mirror 102 and the lower side hyperboloidal mirror 103) to reflect a light from an object within a range of a predetermined horizontal view angle, and this enables an obtainment of information on the distance to the object. Specifically, a first light R1 from the object, after being reflected by the upper side hyperboloidal mirror 102, is further reflected by the lower side hyperboloidal mirror 103 (the inside hyperboloidal mirror 103A), and thereafter, enters the image sensor 105 through the imaging optical system 104. A second light R2 different from the first light R1 from the object is reflected by the lower side hyperboloidal mirror 103 (the outside hyperboloidal mirror 103B), and enters the image sensor 105 through the imaging optical system 104. Thus, the first light R1 and the second light R2 entering different positions on the image sensor 105 from different directions ensures computing, for example, a distance to the object.

The imaging optical system 104 is configured of a combination of one or more lenses, and preferably, the imaging optical system 104 can be arranged on a straight line connecting the apexes of the upper side hyperboloidal mirror 102 and the lower side hyperboloidal mirror 103.

The image sensor 105 is, for example, configured of a Complementary Metal Oxide Semiconductor (CMOS) sensor or a Charge Coupled Device (CCD) sensor, and is configured to generate an image signal based on the light received through the imaging optical system 104 in accordance with a control from the drive controller 118, and output the image signal to the distance calculator 117.

The drive controller 118 controls a vehicle based on the distance information output from the distance calculator 117. The vehicle control includes, for example, a collision damage mitigation brake and a lane departure prevention assistance. The distance calculator 117 generates three-dimensional position information of the object based on the supplied output image. Specifically, the distance calculator 117 computes a three-dimensional position or distance of the object by analyzing the image signal based on the first light R1 and the second light R2. The three-dimensional image information may be supplied to an Electronic Control Unit (ECU) of the automobile on which the stereo camera 101 is mounted or may be transmitted to an external server via a communication control unit, which is not illustrated.

Figure 2:
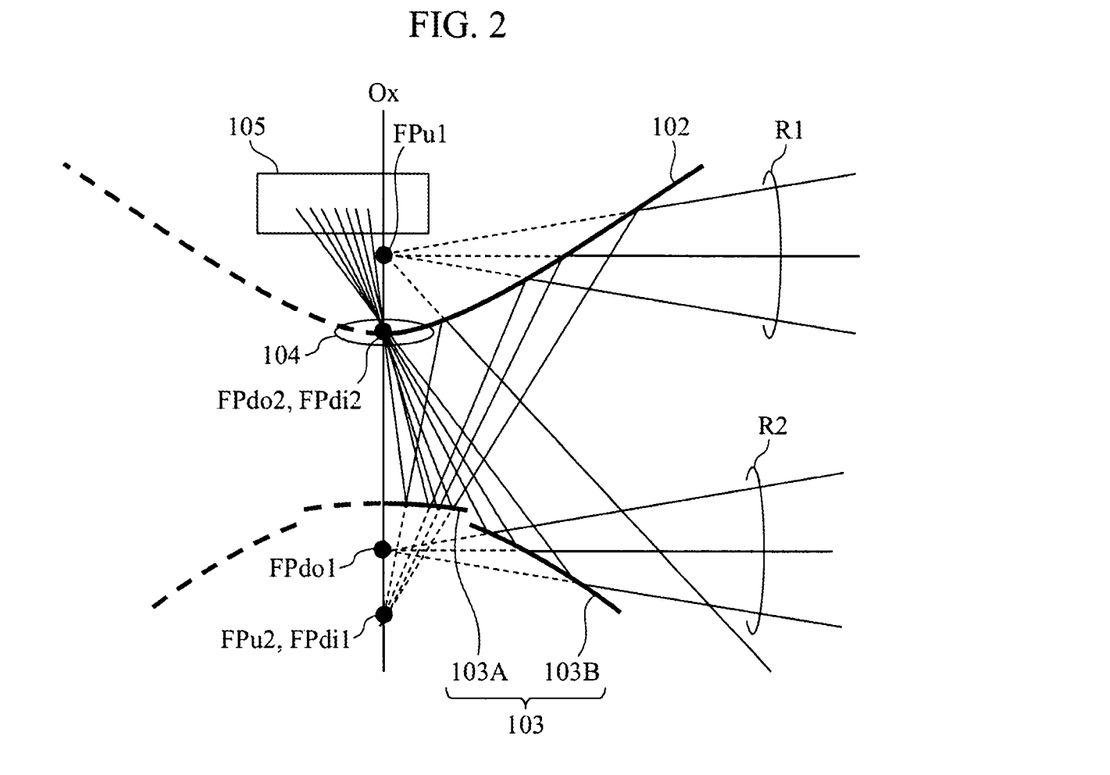
FIG. 2 is a schematic diagram that describes an upper side hyperboloidal mirror 102 and a lower side hyperboloidal mirror 103 (an inside hyperboloidal mirror 103A and an outside hyperboloidal mirror 103B) in further details.

Next, with reference to FIG. 2, the upper side hyperboloidal mirror 102 and the lower side hyperboloidal mirror 103 (the inside hyperboloidal mirror 103A and the outside hyperboloidal mirror 103B) will be described in further detail.

The upper side hyperboloidal mirror 102, the inside hyperboloidal mirror 103A, and the outside hyperboloidal mirror 103B have respective hyperboloids that can be specified by a quadric surface represented by the following [Math. 1]. When a conic constant K is smaller than −1, the quadric surface becomes a hyperboloid. The conic constant K of the inside hyperboloidal mirror 103A has an absolute value that is set to a value greater than an absolute value of the conic constant K of the outside hyperboloidal mirror 103B.

$$z(r) = \frac{cr^2}{1 + \sqrt{1 - (1 + \kappa)c^2 r^2}} \quad [\text{Math. 1}]$$

Here, z(r) in [Math. 1] is an amount of sag of a surface in the optical axis direction with an apex on the optical axis as an origin, where c indicates a curvature on the optical axis (an on-axis curvature), and r indicates a radial coordinate from the optical axis.

Generally, a hyperboloid has two focal points, and its coordinate is represented by the following formula [Math. 2] with a surface apex as a reference.

$$f = \frac{1}{c(1 \pm \sqrt{-\kappa})} \quad [\text{Math. 2}]$$

Note that a coordinate of a focal point inside a hyperboloid is represented by f when "±" in [Math. 2] is +. In [Math. 2], a coordinate of a focal point outside a hyperboloid is represented by f when "±" is −. Hereinafter, the focal points inside the hyperboloids are referred to as a "first focal point," and the focal points outside the hyperboloids are referred to as a "second focal point."

The upper side hyperboloidal mirror 102 and the inside hyperboloidal mirror 103A are arranged such that a second focal point FPu2 of the upper side hyperboloidal mirror 102 approximately coincides with a first focal point FPdi1 of the inside hyperboloidal mirror 103A. Note that while a first focal point FPdo1 of the outside hyperboloidal mirror 103B does not need to coincide with the second focal point FPu2 and the first focal point FPdi1, it is preferable that the outside hyperboloidal mirror 103B is arranged such that the first focal point FPdo1 is at the proximity of them.

The inside hyperboloidal mirror 103A and the outside hyperboloidal mirror 103B are arranged such that a second focal point FPdo2 of the outside hyperboloidal mirror 103B approximately coincides with a second focal point FPdi2 of the inside hyperboloidal mirror 103A. The imaging optical system 104 is arranged at this position of the second focal point FPdo2 and the second focal point FPdi2. Note that while a first focal point FPu1 of the upper side hyperboloidal mirror 102 may approximately coincides with the position of the second focal point FPdo2 and the second focal point FPdi2, it is preferable to be positioned at the proximity of them, specifically, at an upper side with respect to the position of the second focal point FPdo2 and the second focal point FPdi2.

The upper side hyperboloidal mirror 102 and the lower side hyperboloidal mirror 103 having the above-described positional relationship causes the first light R1 heading toward the first focal point FPu1 from the object to head toward the second focal point FPu2 after being reflected by the upper side hyperboloidal mirror 102. The second focal point FPu2 and the first focal point FPdi1 approximately coinciding causes the light reflected by the inside hyperboloidal mirror 103A to be condensed toward the second focal point FPdi2 (the second focal point FPdo2). This light enters the image sensor 105 through the imaging optical system 104.

The second light R2 that heads toward the first focal point FPdo1 from the object heads toward the second focal point FPdo2 (the second focal point FPdi2) after being reflected by the outside hyperboloidal mirror 103B. The second light R2 enters the imaging optical system 104 at an incidence angle different from that of the first light R1, and this causes the second light R2 to enter a position different from that of the first light R1 on a photo-receiving surface of the image sensor 105.

Thus, on the image sensor 105, an image of the object viewed from the first focal point FPu1 is projected based on the first light R1, and an image of the object viewed from the first focal point FPdo1 is projected based on the second light R2. These images are the output images. Note that, as described above, the absolute value of the conic constant K of the inside hyperboloidal mirror 103A is set to the value greater than the absolute value of the conic constant K of the outside hyperboloidal mirror 103B. This equalizes the sizes of the image of the object viewed from the first focal point (an upper view point) FPu1 and the image of the object viewed from the first focal point (a lower view point) FPdo1 in the output images of the image sensor 105. The equalized sizes of the images ensure matching the resolutions of the two images, thereby ensuring an increased accuracy in a parallax matching process.

Figure 3:
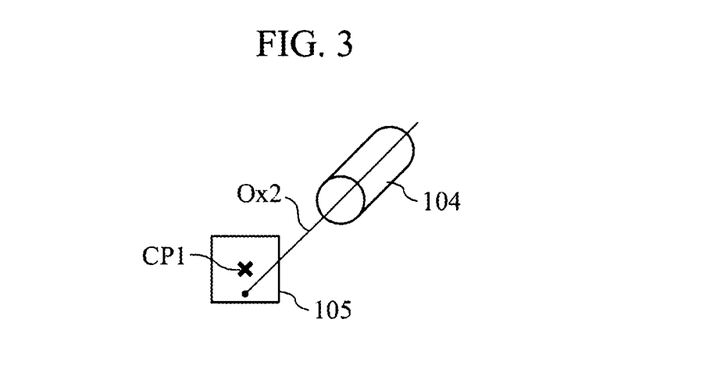
FIG. 3 is a schematic diagram that gives a description relating to a positional relationship between an imaging optical system 104 and an image sensor 105.

Next, a description relating to a positional relationship between the imaging optical system 104 and the image sensor 105 will be given with reference to FIG. 3. An optical axis Ox2 of the imaging optical system 104 is arranged so as to coincide with the center axes Ox of the upper side hyperboloidal mirror 102 and the lower side hyperboloidal mirror 103. On the other hand, a center position CP1 of the photo-receiving surface of the image sensor 105 is at a position displaced from this optical axis Ox2. Specifically, the image sensor 105 is arranged such that the optical axis Ox2 of the imaging optical system 104 is displaced in the direction approximately parallel to a short side Lx of the image sensor 105 with respect to the center position CP1 of the image sensor 105. This ensures receiving the lights reflected from the upper side hyperboloidal mirror 102 and the lower side hyperboloidal mirror 103 having the fan shapes with the interior angles of 180° or more on the wider photo-receiving surface of the image sensor 105, and as the result, the resolution of the stereo camera 101 can be improved. This will be described with reference to FIG. 4 and FIG. 5.

Figure 4:
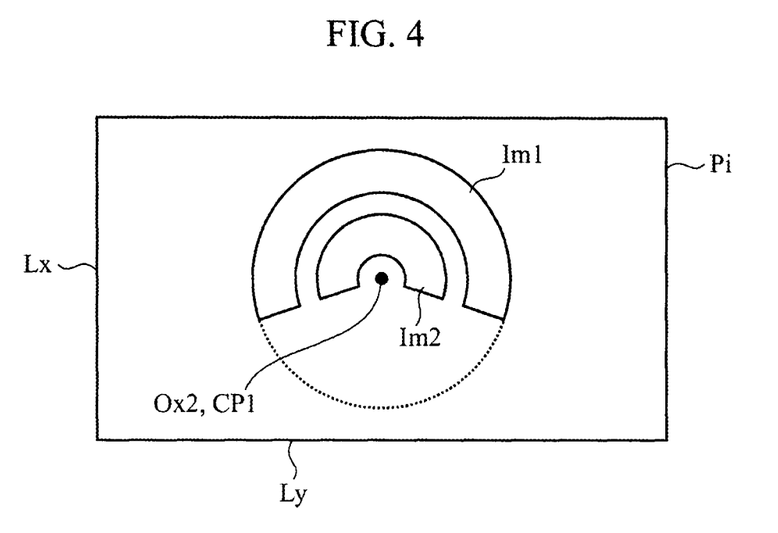
FIG. 4 is one example of a light receiving state of the image sensor 105 when a center position CP1 approximately corresponds to an optical axis Ox2.

FIG. 4 is an example of a light receiving state of the image sensor 105 when the center position CP1 approximately coincides with the optical axis Ox2. In this case, a fan shaped image Im1 based on the first light R1 and a fan shaped image Im2 based on the second light R2 are both mainly formed only on one side (the upper half in FIG. 4) of the center position CP1. In view of this, the number of pixels that contributes to detect the object decreases in the image sensor 105, and a sufficient resolution cannot be obtained.

Figure 5:
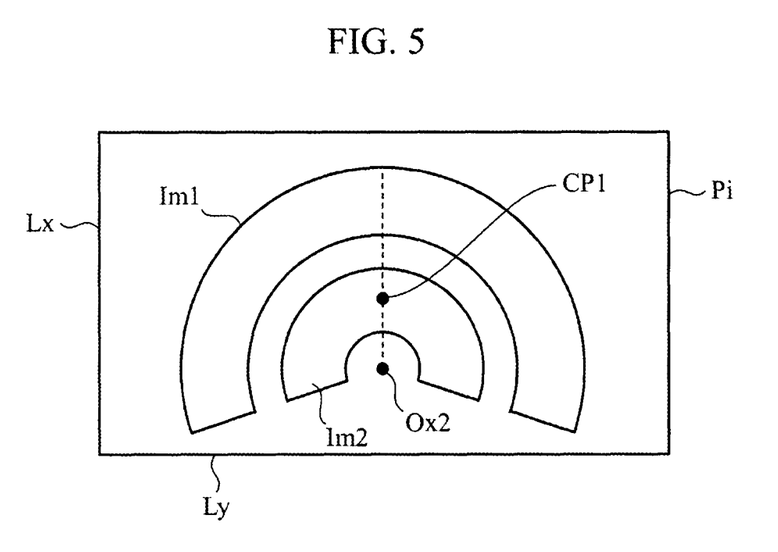
FIG. 5 is one example of a light receiving state of the image sensor 105 when the center position CP1 is at a position displaced from the optical axis Ox2.

Meanwhile, FIG. 5 is an example of a light receiving state of the image sensor 105 when the center position CP1 is displaced from the optical axis O×2. Preferably, the position of the image sensor 105 is adjusted such that the center position CP1 of the image sensor 105 is positioned in the proximity of the images Im1 and Im2 of the upper side hyperboloidal mirror 102 and the lower side hyperboloidal mirror 103 in the fan shapes having the interior angles θ of 180° or more. Therefore, the optical axis O×2 is at a position displaced in a lower side with respect to the center position CP1 in a photo-receiving surface Pi of the image sensor 105. Preferably, the optical axis O×2 is at a position displaced in the vertical direction from the center position CP1. In view of this, the fan shaped images Im1 and Im2 can be received on the wide photo-receiving surface of the image sensor 105 including the lower side, not only the upper side of the center position CP1, unlike the case of FIG. 4.

In this embodiment, the fan shaped images Im1 and Im2 have center lines approximately parallel to the short side Lx of the photo-receiving surface Pi. This arranges the image sensor 105 such that the images Im1 and Im2 are approximately symmetrical on the photo-receiving surface Pi.

Thus, in this embodiment, the images Im1 and Im2 are approximately symmetrical on the photo-receiving surface Pi. The positions of the focal points of the upper side hyperboloidal mirror 102 and the lower side hyperboloidal mirror 103, a magnification of the imaging optical system 104, and the like are set such that the images Im1 and Im2 have the maximum sizes on the photo-receiving surface Pi. Therefore, the resolution of the stereo camera 101 can be improved. When the interior angles θ of the upper side hyperboloidal mirror 102 and the lower side hyperboloidal mirror 103 are 180° or more as described above, displacing the optical axis O×2 from the center of the photo-receiving surface Pi of the image sensor 105, and causing the center lines of the fan shaped images Im1 and Im2 to be approximately parallel to the short side Lx of the photo-receiving surface Pi ensure maximizing the light-receiving area on the photo-receiving surface Pi. As the result, the resolution improves, thereby ensuring accurately detecting the distance to the object.

Figure 6:
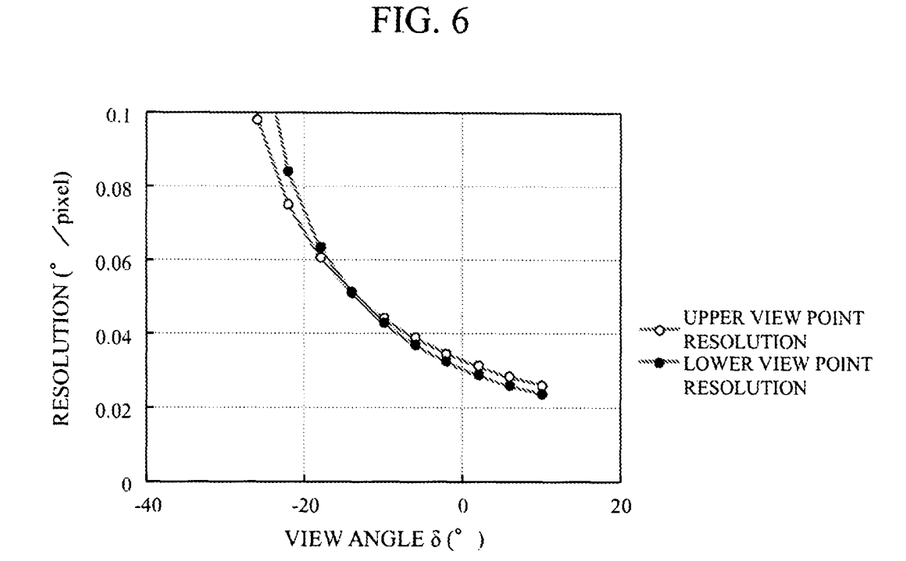
FIG. 6 is a graph that shows a relationship between a view angle δ in the perpendicular direction of the stereo camera 101 and a resolution.

A graph in FIG. 6 shows a relationship between a view angle δ in the perpendicular direction of the stereo camera 101 and the resolution. Here, in the view angle δ, 0° indicates the horizontal direction, the view angle δ of negative values means the downward direction with respect to the horizontal direction, and the view angle δ of positive values means the upward direction with respect to the horizontal direction.

When the stereo camera 101 is a camera for an automatic drive control of an automobile, while a high resolution is required in the horizontal direction and the upper side thereof, the high resolution is not necessary in the lower side with respect to the horizontal direction and it is sufficient as long as stop lines and center lines on the road are recognized. In view of this, the imaging optical system 104 and the hyperboloidal mirrors are configured such that in the direction where the view angle δ is 0 or more, a value of the resolution (°/pixel) is decreased while a value of the resolution (°/pixel) is increased as the negative value of the view angle δ increases.

Note that the resolution of the stereo camera 101 can be divided into a resolution of the image based on the light received from the first focal point FPu1 (upper view point) based on the first light R1 (upper view point resolution) and a resolution of the image based on the light received from the first focal point FPdo1 (lower view point) based on the second light R2 (lower view point resolution). As illustrated in FIG. 6, it is preferable to design the imaging optical system 104 or the hyperboloidal mirrors (102 and 103), or the imaging optical system 104 and the hyperboloidal mirrors (102 and 103) such that the upper view point resolution and the lower view point resolution becomes approximately equal in a range of a predetermined view angle δ. Obtaining the relationship as in FIG. 6 makes the resolutions of the images Im1 and Im2 approximately the same, thereby ensuring further accurately computing the distance to the object.

Figure 7:
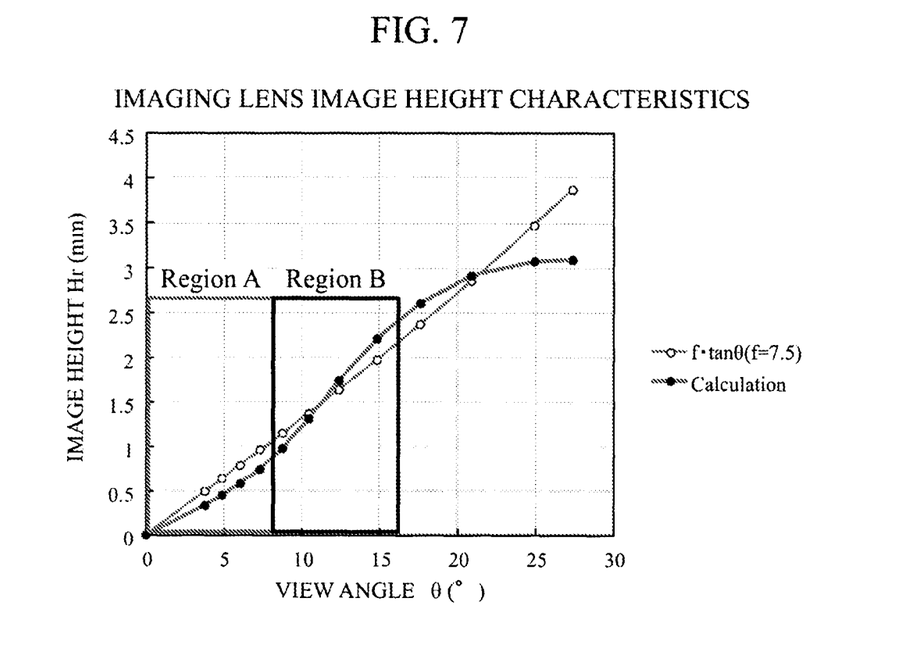
FIG. 7 is a graph that shows a relationship between a view angle θ of the imaging optical system 104 and an image height Hr.

A graph in FIG. 7 shows a relationship between a view angle θ of the imaging optical system 104 and an image height Hr. In this first embodiment, the imaging optical system 104 is designed such that the image height Hr becomes smaller than an ideal image height Hi (=f·tan θ) in a region A close to the optical axis O×2 while the image height Hr becomes larger than the ideal image height Hi in a region B outside with respect to the region A. A curved line that shows the relationship between the view angle θ and the image height Hr is designed such that an inflection point is present at the proximity of the boundary between the region A and the region B, and an inclination of the curved line near the boundary become large compared with those in the other regions. This increases an angular resolution near a middle circumference of the imaging optical system 104 compared with those near the optical axis and near the outer circumference. Such a design of the imaging optical system 104 ensures detecting an object that moves obliquely ahead of the vehicle with a further high accuracy when, for example, the stereo camera 101 is used for the automatic drive control.

Figure 8A:
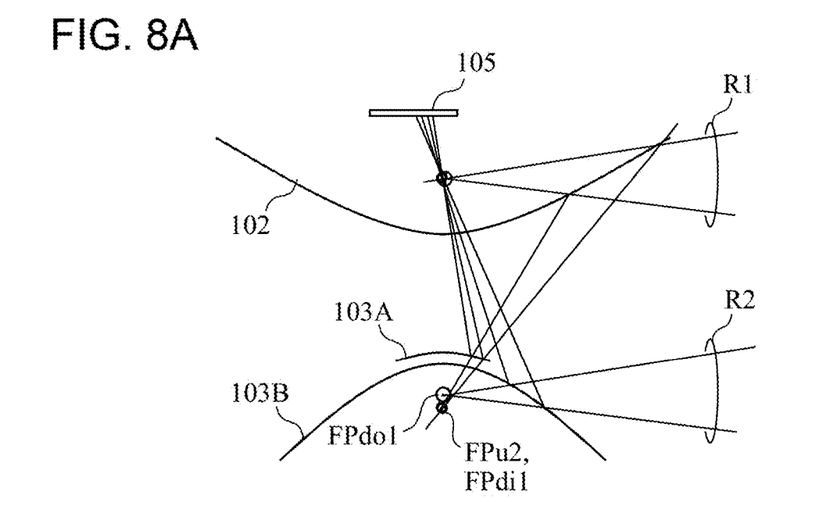
FIGS. 8A and 8B are schematic diagrams that describe structures of the inside hyperboloidal mirror 103A and the outside hyperboloidal mirror 103B, and their effects.

Note that, as described above, it is preferred that the inside hyperboloidal mirror 103A and the outside hyperboloidal mirror 103B have a level difference at their boundary, and the inside hyperboloidal mirror 103A projects upward compared with the outside hyperboloidal mirror 103B. FIG. 8A illustrates an example of a light receiving state of the first light R1 and the second light R2 when the inside hyperboloidal mirror 103A projects upward compared with the outside hyperboloidal mirror 103B. Meanwhile, FIG. 8B illustrates an example of a light receiving state of the first light R1 and the second light R2 when there is no level difference between the inside hyperboloidal mirror 103A and the outside hyperboloidal mirror 103B, unlike this embodiment.

Figure 8B:
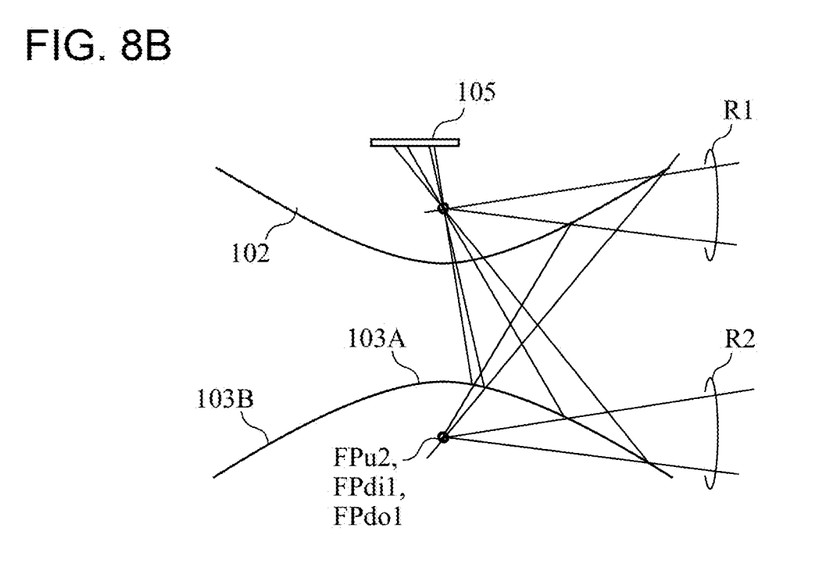

In the case of FIG. 8B, the distance between the first focal point FPu1 and the first focal point FPdo1 is large, and therefore, the distance between the light receiving positions of the first light R1 and the second light R2 on the image sensor 105 also increases to decrease the view angle that ensures a stereoscopic view. In this respect, the distance between the light receiving positions of the first light R1 and the second light R2 can be decreased in the first embodiment (FIG. 8A), and the view angle that ensures the stereoscopic view can be increased. Alternatively, the resolution of the image sensor 105 is improved to ensure an improved detection accuracy of the distance to the object.

In the first embodiment described above, the mutually opposed hyperboloidal mirrors are used as a pair of mirrors to reflect the lights from the object. However, the pair of mirrors are not limited to the hyperboloidal mirrors as illustrated in the drawings, and it is possible to employ spherical mirrors, parabolic mirrors, elliptical mirrors, non-spherical mirrors, or the like that are mutually opposed instead of the hyperboloidal mirrors.

As described above, the stereo camera 101 in the first embodiment has the upper side hyperboloidal mirror 102 and the lower side hyperboloidal mirror 103 configuring the hyperboloidal mirrors. The upper side hyperboloidal mirror 102 and the lower side hyperboloidal mirror 103 are formed into the fan shapes that have the interior angles θ of 180° or more. In order to be able to maximally receive the images from these hyperboloidal mirrors in the fan shapes, the center position of the image sensor 105 is at the position displaced with respect to the optical axis of the imaging optical system. Furthermore, the image sensor 105 is arranged such that the center lines of the images in the fan shapes are approximately parallel to the short side of the image sensor 105. This ensures providing a stereo camera that ensure sensing with a high accuracy and at a wide-angle, and is small in size.

Second Embodiment

Figure 9:
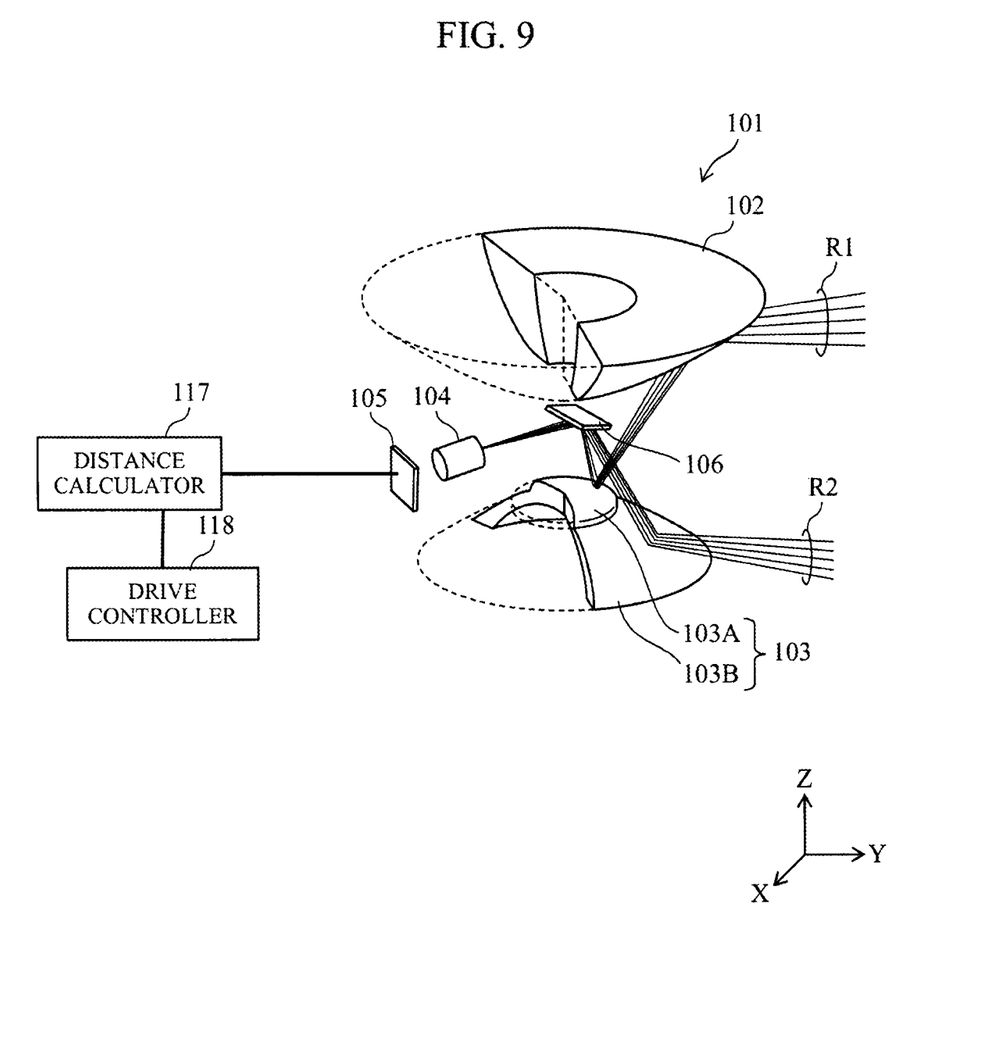
FIG. 9 is a schematic perspective view that describes a structure of the stereo camera 101 according to a second embodiment.

Next, the stereo camera 101 according to the second embodiment will be described with reference to FIG. 9. In FIG. 9, configuration members identical to those in FIG. 1 are attached by reference numerals identical to those in FIG. 1, and the overlapping descriptions are omitted.

In this second embodiment, a reflective mirror 106 is provided between the imaging optical system 104 and the lower side hyperboloidal mirror 103. The location of the imaging optical system 104 is also in the reflection direction of this reflective mirror 106, and in this respect, it is different from the first embodiment in that the imaging optical system 104 is arranged in the proximity of the apex of the hyperboloid of the upper side hyperboloidal mirror.

With this configuration, since the incident light into the imaging optical system 104 can be folded back on the reflective mirror 106, the imaging optical system 104 and the image sensor 105 can be housed within a range of the height of the hyperboloidal mirrors (the upper side hyperboloidal mirror 102 and the lower side hyperboloidal mirror 103). Therefore, the size of the stereo camera 101 can be decreased.

Each embodiment and modification according to the present invention has been described above, the present invention is not limited to the above-described exemplary embodiments and includes various modifications. For example, the exemplary embodiments described above are explained in detail for easy understanding of the present invention, and do not necessarily include all the explained configurations here. A part of the configuration of one exemplary embodiment can be replaced by the configuration of another exemplary embodiment. The configuration of one exemplary embodiment can be used with the addition of another exemplary configuration. For a part of the configurations in the respective exemplary embodiments, another configuration can be added, deleted, or replaced. The respective configuration, function, processing unit, processing means, and the like described above may be achieved by hardware by, for example, designing a part or all thereof with, for example, an integrated circuit.

DESCRIPTION OF SYMBOLS

101 Stereo camera
102 Upper side hyperboloidal mirror
103 Lower side hyperboloidal mirror
103A Inside hyperboloidal mirror
103B Outside hyperboloidal mirror
104 Imaging optical system
105 Image sensor
117 Distance calculator
118 Drive controller

What is claimed is:

1. A stereo camera comprising:

a first mirror that has a first reflecting surface as a curved surface convexed in a first direction, a first apex, and a first fan shape;

a second mirror that has a second reflecting surface convexed in a second direction opposite to the first direction, a second apex opposing to the first apex, and a second fan shape;

an imaging optical system that forms images from a first light and a second light, the first light being emitted from an object, reflected by the first reflecting surface, and subsequently further reflected by the second reflecting surface, the second light being emitted from the object and reflected by the second reflecting surface; and an image sensor that receives the first light and the second light through the imaging optical system, wherein the second mirror includes an inside mirror and an outside mirror, the outside mirror being positioned in an outer circumferential side with respect to the inside mirror, the outside mirror having a conic constant different from a conic constant of the inside mirror, wherein the first fan shape and the second fan shape have interior angles of 180° or more, and wherein the image sensor is arranged such that a center position of the image sensor is arranged at a position displaced with respect to an optical axis of the imaging optical system, and a short side of a photo-receiving surface of the image sensor and a center line of the image of the first fan shape or the second fan shape are approximately parallel, and wherein the image sensor and the imaging optical system are both disposed within a concave portion of the first mirror to receive both the first light and the second light.

2. The stereo camera according to claim 1, wherein the first light is a light that heads toward a first focal point of the first mirror to be reflected by the first reflecting surface, and subsequently heads toward a first focal point of the inside mirror to be reflected by the second reflecting surface, and wherein the second light is a light that heads toward a first focal point of the outside mirror to be reflected by the second reflecting surface.

3. The stereo camera according to claim 1, wherein the first mirror and the second mirror are arranged such that a second focal point of the first mirror approximately coincides with a first focal point of the inside mirror.

4. The stereo camera according to claim 3, wherein the inside mirror and the outside mirror are arranged such that a second focal point of the inside mirror approximately coincides with a second focal point of the outside mirror.

5. The stereo camera according to claim 1, further comprising a mirror arranged so as to reflect the first light or the second light toward the imaging optical system.

6. The stereo camera according to claim 1, wherein the outside mirror has a level difference from an outer circumference of the inside mirror.

7. The stereo camera according to claim 1,
wherein the image sensor is arranged such that the optical axis of the imaging optical system is displaced in a direction approximately parallel to the short side of the image sensor with respect to the center position of the image sensor.

8. The stereo camera according to claim 1,
wherein the first mirror, the second mirror, and the imaging optical system are designed such that an upper view point resolution and a lower view point resolution are approximately equal in a range of a predetermined view angle, the upper view point resolution being a resolution of an image formed on the image sensor based on the first light, the lower view point resolution being a resolution of an image formed on the image sensor based on the second light.

9. The stereo camera according to claim 1,
wherein the imaging optical system is designed such that an image height becomes smaller than an ideal image height in a first region while an image height becomes larger than the ideal image height in a second region outside with respect to the first region.

* * * * *